(12) United States Patent
Mangold et al.

(10) Patent No.: US 8,332,604 B2
(45) Date of Patent: Dec. 11, 2012

(54) METHODS TO SECURELY BIND AN ENCRYPTION KEY TO A STORAGE DEVICE

(75) Inventors: Richard P. Mangold, Forest Grove, OR (US); Debra Hensgen, San Jose, CA (US); Sanjeev N. Trika, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 12/286,505

(22) Filed: Sep. 30, 2008

(65) Prior Publication Data

US 2010/0082898 A1    Apr. 1, 2010

(51) Int. Cl.
*G06F 12/00* (2006.01)
(52) U.S. Cl. ................... 711/164; 711/E12.092
(58) Field of Classification Search .................. None
See application file for complete search history.

(56) References Cited

U.S. PATENT DOCUMENTS

| | | | | |
|---|---|---|---|---|
| 6,470,447 | B1 * | 10/2002 | Lambert et al. | 713/151 |
| 8,037,319 | B1 * | 10/2011 | Clifford | 713/193 |
| 2006/0161445 | A1 | 7/2006 | Frank | |
| 2008/0163383 | A1 | 7/2008 | Kumar | |
| 2011/0029785 | A1 * | 2/2011 | Foster et al. | 713/189 |

OTHER PUBLICATIONS

Cilardo et al. "An FPGA-based Key-Store for Improving the Dependability of Security Services", Proceedings of the 10th IEEE International Workshop on Object-Oriented Real-Time Dependable Systems (WORDS'05), 2005, 8 pages.*
Smith, Ned M., et al.; "Methods and Apparatus for Providing Upgradeable Key Bindings for Trusted Platform Modules", Assigned U.S. Appl. No. 11/863,233, filed Sep. 27, 2007.

* cited by examiner

*Primary Examiner* — Edward Dudek, Jr.
*Assistant Examiner* — John P Fishburn
(74) *Attorney, Agent, or Firm* — Kacvinsky Daisak PLLC

(57) ABSTRACT

Embodiments of methods to securely bind a disk cache encryption key to a cache device are generally described herein. Other embodiments may be described and claimed.

13 Claims, 4 Drawing Sheets

METHODS TO SECURELY BIND AN ENCRYPTION KEY TO A STORAGE DEVICE

TECHNICAL FIELD

The present disclosure relates generally to the field of data processing, and more particularly to methods and related apparatus for authenticating components of processing systems and their user access.

BACKGROUND

A processing system may include hardware resources, such as a central processing unit (CPU), a volatile memory such as random access memory (RAM), and a non-volatile memory device such as a hard disk drive (HDD). The processing system may also include software resources, such as a basic input/output system (BIOS), a virtual machine monitor (VMM), and one or more guest operating systems (OSs) running on the VMM. When the computer system is booted through a start or reset, it may load the BIOS, and then the VMM. The VMM may then create one or more virtual machines, and the virtual machines may boot to different OSs or to different instances of the same OS. Alternately, an OS may be loaded directly after the BIOS.

In addition to RAM and one or more CPUs, a processing system may include a security coprocessor, such as a trusted platform module (TPM). A TPM is a hardware component that resides within a processing system and provides various facilities and services for enhancing the security of the processing system. For example, a TPM may be implemented as an integrated circuit (IC) or semiconductor chip, and it may be used to protect data and to attest to the configuration of a platform. A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is available from the Internet at www.trustedcomputinggroup.org/home.

The sub-components of a TPM may include an execution engine and secure nonvolatile (NV) memory or storage. The secure NV memory is used to store sensitive information, such as encryption keys, and the execution engine protects the sensitive information according to the security policies dictated by the TPM's control logic.

Alternate non-volatile memory devices, such as on-board or removable low latency disk cache may be added to processing systems to either replace the HDD or to complement the HDD depending on the use and form of the processing system. The disk cache may be used to increase the system performance by storing critical data and applications that would otherwise be stored on a HDD. Data normally stored on a HDD is sometimes encrypted to protect the integrity of the processing system and to prevent non-authorized access to information stored in the processing system. In such cases, the disk cache data should be encrypted as well.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
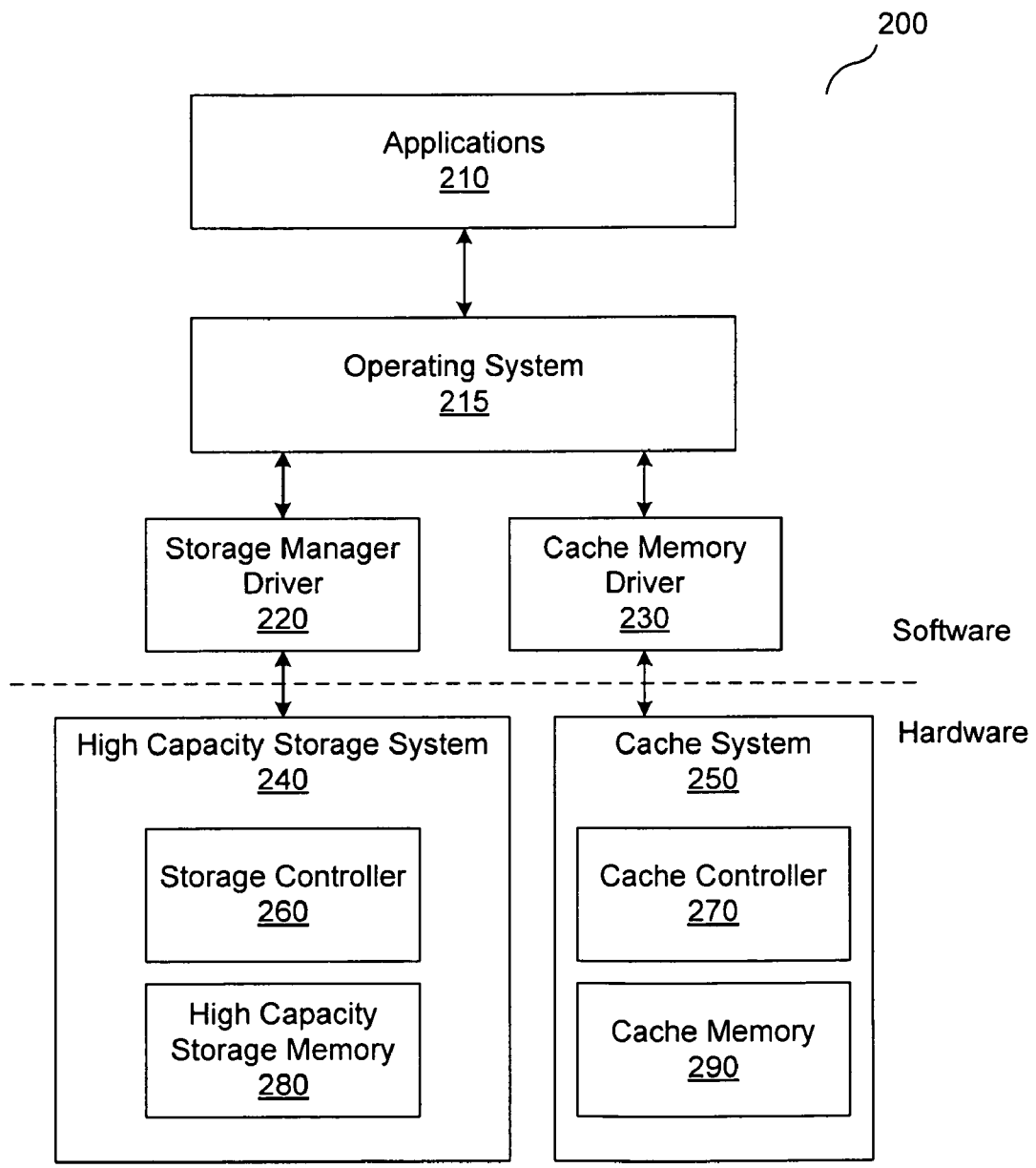
FIG. 1 is a block diagram of a large capacity storage system and a cache system configured to communicate with an operating system.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for securely binding a disk cache encryption key to a storage device are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to securely bind a disk cache encryption key to a storage system such as a cache system or other persistent memory, particularly in applications where the cache system is provided to complement high capacity storage systems while avoiding inherent performance limitations of the storage systems. The cache system, such as a solid-state memory, may be used to store copies of data that is frequently accessed on the high capacity storage system, such as a hard drive. Storage of the frequently accessed data, known as caching, may allow a processing system to perform higher by accessing data cached on a solid-state drive than would otherwise be provided by accessing the same data on a hard drive. Encryption is typically employed to protect data on high capacity storage systems and similar protection is sometimes needed to protect cached data on the cache system. Minimal user intervention for data decryption is usually preferred. Methods to decrypt both the high capacity storage system and the cache system with a single key by securely binding a disk cache encryption key to the cache system can allow a user to enjoy the performance benefits of cached storage with security protection provided by a shared encryption scheme.

One such method for securely binding a disk cache encryption key to a cache system may comprise binding the cache system to a disk. A disk location in the disk is identified and the cache key is stored in the disk location. The disk location is stored in the cache system and caching of the disk to the cache system is enabled. The cache system is then encrypted with the cache key.

FIG. 1 is a logical layout of a processing system 200 comprising a high capacity storage system 240 and a caching system 250 configured to communicate with an operating system 215. The operating system 215 is responsible for the management and coordination of activities and sharing of resources of the processing system 200. The operating system 215 further acts as a host for application programs that are run on the processing system 200. Functionally, the operating system 215 reads and writes to and from the cache system 250 and the high capacity storage system 240 while interacting with one or more applications 210 that operate through the operating system 215.

In one embodiment, the applications 210 may provide word processing, spreadsheet, media player, matrix storage, and one or more cryptography and/or encryption capabilities. The operating system 215 interacts with the high capacity storage system 240 through a storage manager driver 220, and interacts with a cache system 250 through a cache memory driver 230. An embodiment of the high capacity storage system 240, comprising a storage controller 260 and a high capacity storage memory 280, may be a disk such as a hard disk or disk drive, a networked storage location, a RAID volume, a tape drive, a floppy drive, or an optical drive such as a digital video disk (DVD) and/or compact disk (CD) reader and/or writer or combination thereof.

An embodiment of the cache system 250 may be a cache drive, a solid state drive (SSD) connected to a processor using a serial advanced technology attachment (ATA), a parallel ATA, and/or a universal serial bus (USB) interface, or an Intel® Turbo Memory connected to a processor using high speed input/output (I/O) controller hub (ICH) or platform control hub (PCH). Data may be stored in either single level cell (SLC) or multi-level cell (MLC) format. The cache system 250 may provide read and/or write caching functionality and is designed to improve processing system 200 responsiveness such as reduced boot time and/or provide power savings, for example, by replacing or substituting HDD functionality with solid state functionality.

In FIG. 1, the cache system 250 comprises a cache controller 270, which may be an application specific integrated circuit controller (ASIC) device and a cache memory 290, which may be one or more NAND flash or phase change (PC) memory devices. In addition, the cache system 250 may also comprise a cache memory driver 230 and a disk filtering option read only memory (ROM) in the form of pre-boot software to handle basic input output system (BIOS) level disk access. In some embodiments, the storage manager driver 220 and the cache memory driver 230 can be combined into a single driver.

Figure 2:
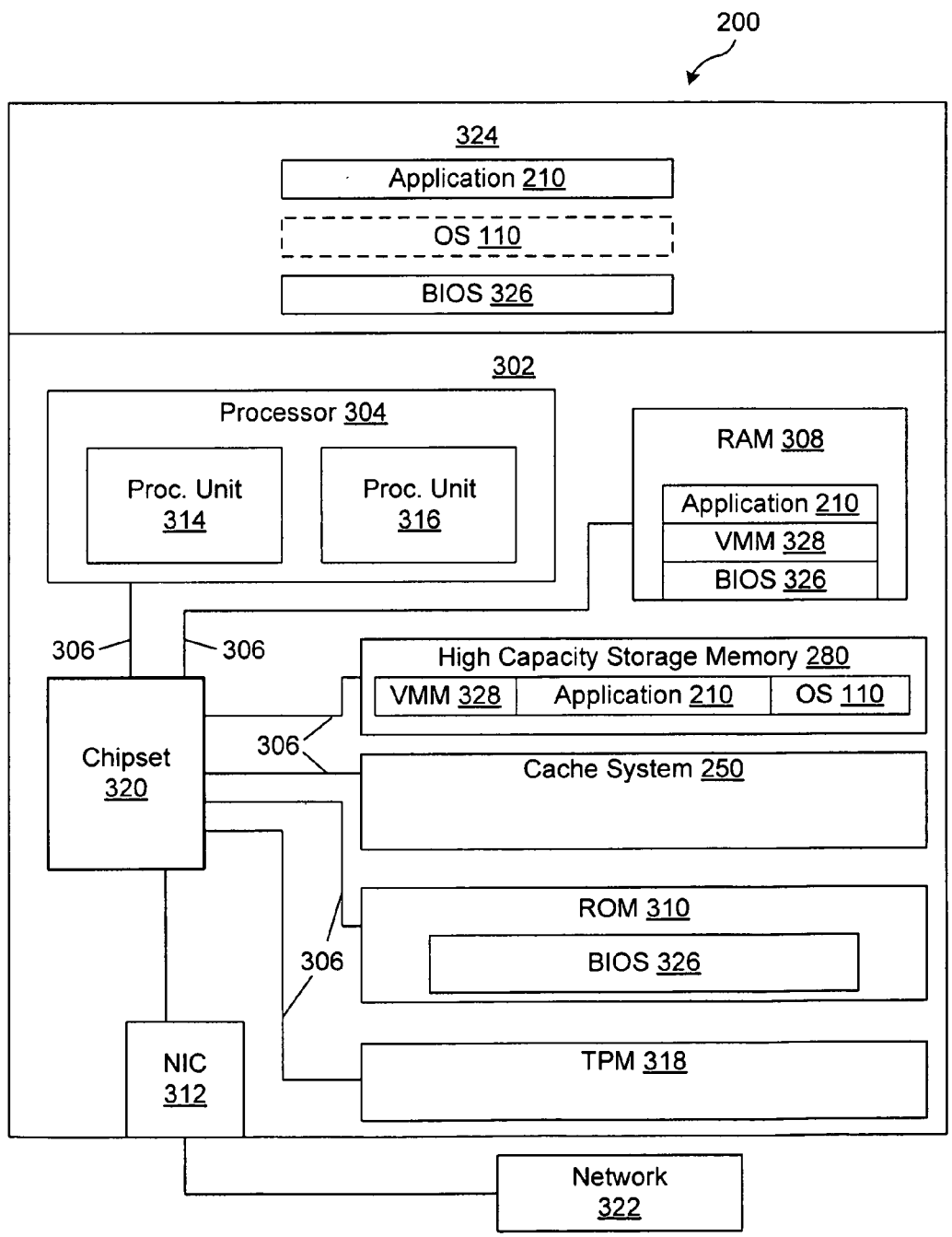
FIG. 2 is a block diagram depicting a processing system in which an embodiment of the invention may be implemented.

FIG. 2 is a block diagram depicting a processing system 200 in which an embodiment of the invention may be implemented. Processing system 200 has various hardware components 302, such as a processor 304 or central processing unit (CPU) communicatively coupled to various other components via one or more system buses 306 or other communication pathways or mediums. For example, processor 304 may be communicatively coupled to one or more volatile or nonvolatile data storage devices (e.g., RAM 308, ROM 310, and one or more high capacity storage systems 240). Processor 304 may also be communicatively coupled to one or more network interface controllers (NICs) 312, video controllers, integrated drive electronics (IDE) controllers, small computer system interface (SCSI) controllers, universal serial bus (USB) controllers, input/output (I/O) ports, input devices, output devices such as a display, etc.

In the embodiment of FIG. 2, processor 304 includes a first processing unit 314 and a second processing unit 316. Alternatively, the processing system 200 may include a processor 304 with one processing unit, or multiple processors, each having at least one processing unit. In systems with multiple processing units, those processing units may be implemented as processing cores, as Hyper-Threading (HT) technology, or as any other suitable technology for executing multiple threads simultaneously or substantially simultaneously.

Processing system 200 also includes a TPM 318. For purposes of this discussion, the term "TPM" refers to the control logic and protected storage in a processing system that work together to provide for (a) storing a measurement of the system configuration (e.g., a hash of the system configuration), (b) providing verified evidence of the system configuration (e.g., a signed configuration measurement), and (c) restricting access to protected digital keys, based at least in part on whether a current system configuration matches a predetermined approved configuration. A TPM may be implemented as a discrete module that is communicatively coupled to the processor 304, possibly via a chipset 320 or other intermediate modules. Alternatively, some or all of the control logic and protected storage for a TPM and/or the cache controller 270 may be implemented as part of one or more other components (e.g., a NIC, an I/O controller, an I/O hub, a processor, etc.). In the embodiment of FIG. 2, TPM 318 is a discrete module that is communicatively coupled to processor 304 via the chipset 320. Chipset 320 may include one or more bridges or hubs for communicatively coupling system components, as well as other logic and storage components.

Some components may be implemented as adapter cards with interfaces (e.g., a PCI connector) for communicating with a bus. In one embodiment, one or more devices may be implemented as embedded controllers, using components such as programmable or non-programmable logic devices or arrays, ASICs, embedded computers, smart cards, and the like. For purposes of this discussion, the term "ROM" may be used in general to refer to nonvolatile memory devices such as erasable programmable ROM (EPROM), electrically erasable programmable ROM (EEPROM), flash ROM, flash memory, etc. Also, the term "bus" refers to shared communication pathways, as well as point-to-point pathways.

Processing system 200 may be controlled, at least in part, by input from conventional input devices, such as a keyboard, a mouse, etc., and/or by directives received from another machine, biometric feedback, or other input sources or signals. Processing system 200 may utilize one or more connections to one or more remote data processing systems through a network 322, such as through NIC 312, a modem, or other communication ports or couplings. Processing systems 200 may be interconnected to form a data processing environment through use of the physical and/or logical network 322, such as a local area network (LAN), a wide area network (WAN), an intranet, the Internet, etc. Communications involving the network 322 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as worldwide interoperability for microwave access (WiMAX) or wireless metropolitan area network (WirelessMAN) protocols, and information concerning those protocols is currently available at grouper.ieee.org/groups/802/16/index.html.

Embodiments may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or nonvolatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. The programs in processing system 200 may be considered components of a software environment 324.

For instance, when processing system 200 boots, a BIOS 326 may be loaded into RAM 308 and executed within software environment 324. Processing system 200 may also load and run a VMM 328 and/or one or mode OSs 215 within software environment 324. For example, if processing system 200 has not been configured for virtualization, VMM 328 may be unnecessary, and applications may run on top of OS 215. In other embodiments, VMM 328 may launch various guest OSs and user applications in separate virtual machines within software environment 324.

A typical conventional use of a TPM involves creating a central key for an application or system, and then creating a logical hierarchy of keys as children or descendants of that key. All of these keys may be considered user keys, and the central key may be called the Root User Key. Any or all of these keys may have PCR bindings. However, a child key cannot be loaded into the TPM unless the bindings for the parents of that child key are satisfied. Consequently, it is usually sufficient to protect the Root User Key with bindings and not every individual child key.

The types of programs that may use TPM key structures include, without limitation, system software such as VMM 328 and OS 215, and user applications such as application 210. For instance, a VMM 328 or an OS 215 may use TPM keys for functions such as file encryption, identity management, and configuration attestation. A media player application may use TPM keys for purposes of digital rights management (DRM). Software applications for other purposes (e.g., file encryption, virus protection, etc.) may use TPM keys as well. For purposes of this disclosure, the term "system software" refers to the software that runs under the user applications.

Figure 3:
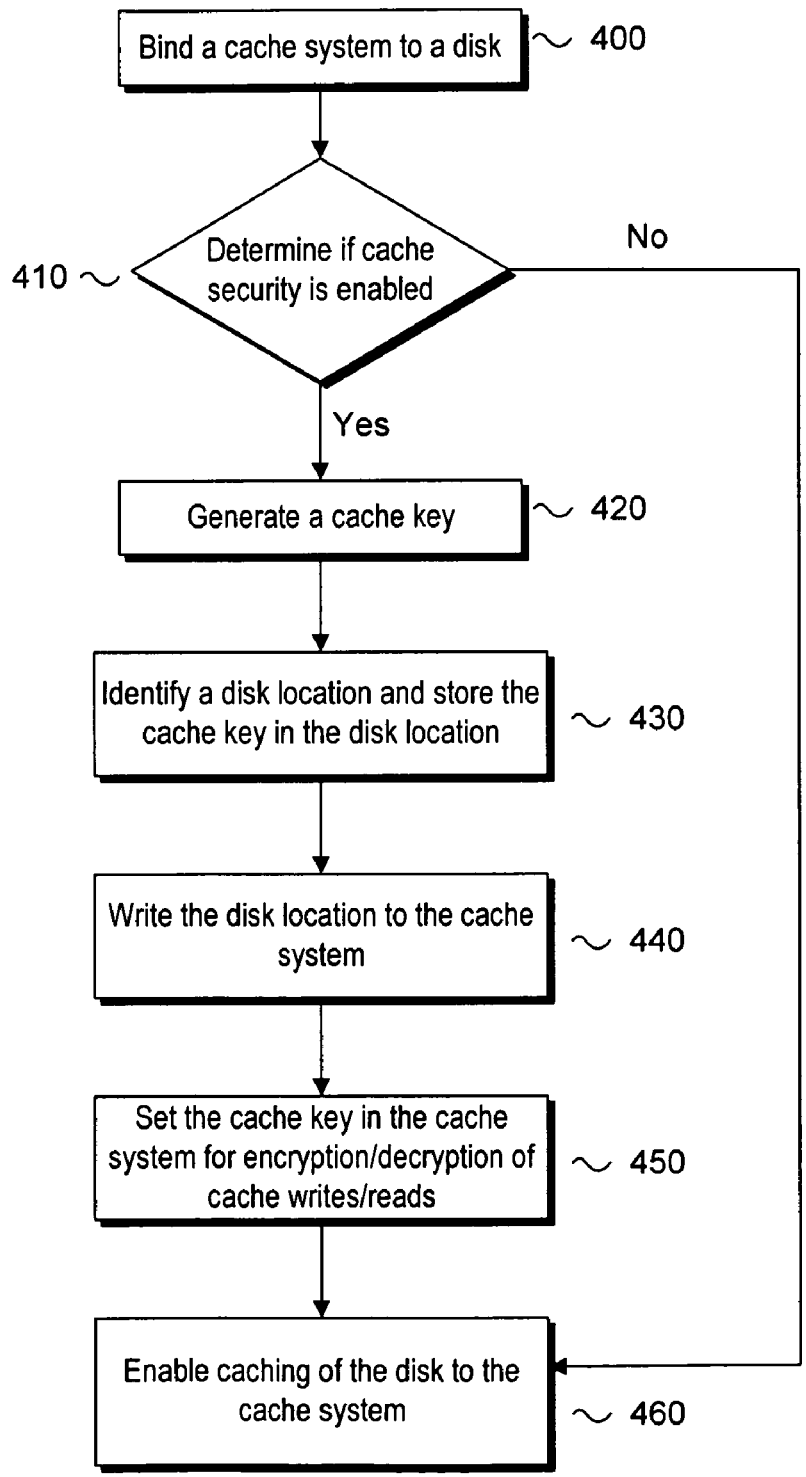
FIG. 3 is a flowchart that describes a key generation process.

FIG. 3 is a flowchart that describes a key generation and disk binding process in which an embodiment of the invention may be implemented. This embodiment of the invention may be used to ensure that data on a cache system 250 is as secure as data on the high capacity storage system 240 that it is caching. Implementing this or an alternative embodiment will allow data on the cache system 250 to be locked when the high capacity storage system 240 is locked. In addition, the method of FIG. 3 also provides a means for a processing system 200 to authenticate a cache system 250 without requiring the user to supply any information other than what the user must enter to access data from the high capacity storage system 240. As a result, the method of FIG. 3 eliminates a need for a separate encryption key for a cache system 250 from that what is already used for the high capacity storage system 240.

In element 400, a cache system 250 is associated with a high capacity storage system 240 by binding the cache system 250 to the high capacity storage system 240 of a processing system 200 using an installation and/or setup matrix storage application of applications 210. The cache system 250 may first determine if the high capacity storage system 240 supports binding by sending a message to the high capacity storage system 240. When the high capacity storage system 240 supports binding, the cache system 250 and the high capacity storage system 240 may negotiate the method, or more specifically, a cryptographic algorithm, to be used for subsequent authentication. For example, they may agree to use a shared secret and symmetric encryption algorithm. In another embodiment, the use of public key cryptography may be used to exchange signed, authenticated messages between the cache system 250 and the high capacity storage system 240, where user and root certificates may be employed to establish trust relationships. In some embodiments, the high capacity storage system 240 may support a variety of algorithms and processes to accommodate devices having more or less cryptographic capability and/or varying needs for security.

Once an algorithm is established, the high capacity storage system 240 and the cache system 250 may exchange data for use in subsequent verification. For example, the high capacity storage system 240 and the cache system 250 may use a Diffie-Hellman key exchange to create a shared secret for use with an advanced encryption standard (AES) algorithm. As mentioned earlier, public key technology may also be employed in the authentication process. A secure channel, known to those skilled in the art, may be established between the high capacity storage system 240 and the cache system 250 to further secure the binding process. One or more encryption engines to generate one or more encryption algorithms may be used, for example, a first encryption engine may be used for the cache system 250 and a second encryption engine may be used for the high capacity storage system 240.

In the embodiment of FIG. 3, the cache system 250 determines whether cache security is enabled (element 410). If a cache security mechanism is not enabled, then the high capacity storage system 240 may cache to the cache system 250 (element 460). If a cache security mechanism is enabled, then a random encryption key or cache key is generated (element 420) using an encryption application 210. In an alternate embodiment, the cache key is provided from a user as opposed to being auto generated, as described in element 420. A key location in the high capacity storage system 240 is identified for storage of the random encryption key (element 430). Enabling the cache security system allows automatic encryption of the user/cache data during storage, and conversely, read access of encrypted user/cache data are automatically decrypted. The random encryption key location is preferably situated in a hidden and fixed space in the high capacity storage system 240. The random encryption key is preferably located in a key location situated in a same partition that contains ordinary user data, so if the ordinary user data is encrypted, then the random encryption key is also encrypted.

In element 440 of this embodiment, the random encryption key, or cache key, is also loaded by the cache memory driver 230 in the cache system 250, preferably in a write-only location. The cache system 250 may have limited functionality if the cache key is not stored in the cache system 250. Also, the cache key in the high capacity storage system 240 is set in the cache system 250 for encryption/decryption of cache writes/reads (element 450). The cache system is encrypted with the cache key and caching of the high capacity storage system 240 by the cache system 250 is enabled in element 460 to provide write access of user/cache data. In another embodiment, the cache security system may additionally request a confirmation key to authenticate a user before providing write access of user/cache data. In a further embodiment, the cache system 250 may be triggered to authenticate the high capacity storage system 240 in response to one of a power cycle, a time period, a usage volume, and a random event.

Figure 4:
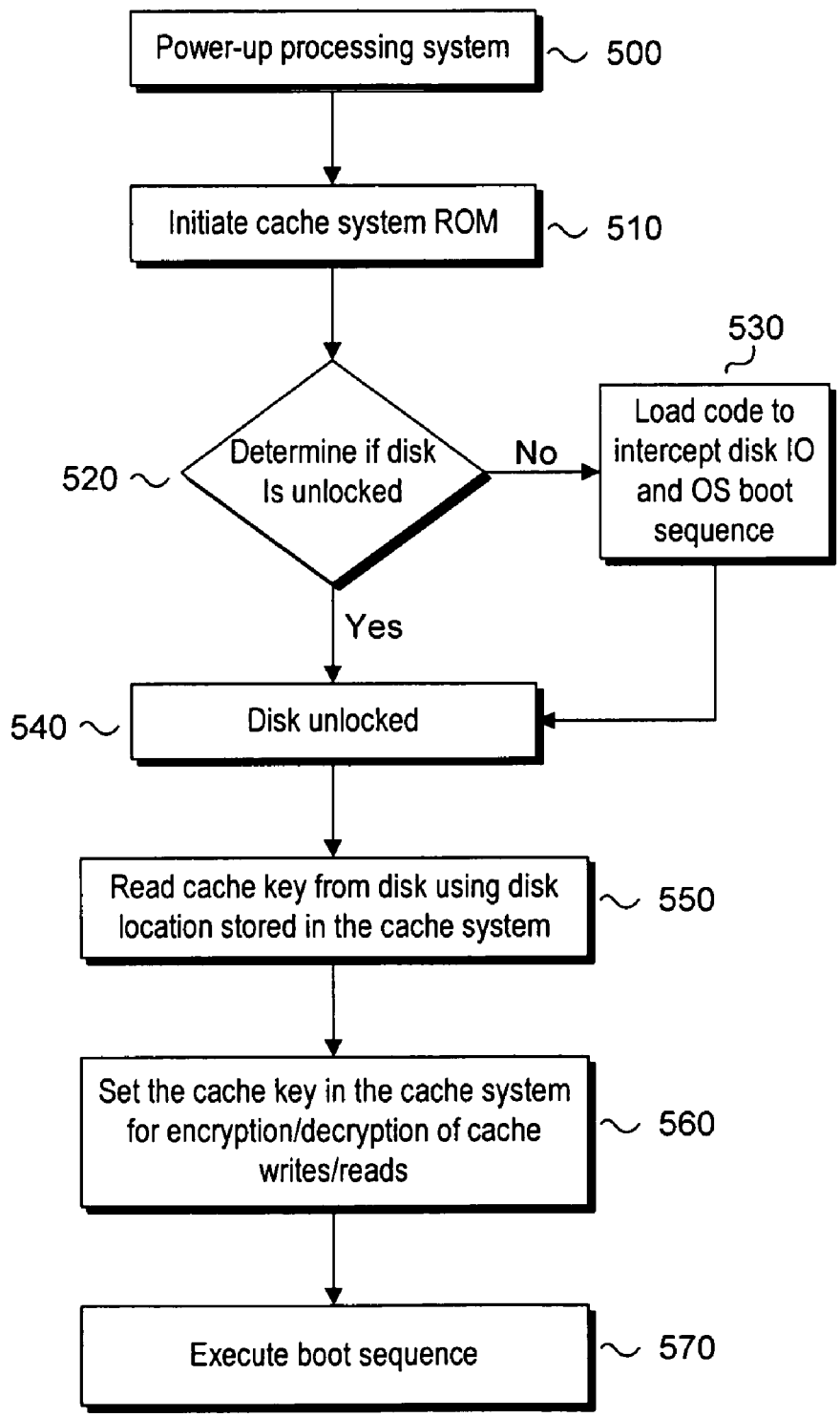
FIG. 4 is a flowchart that describes a power-up key management sequence.

FIG. 4 is a flowchart that describes a power up key management sequence in which an embodiment of the invention may be implemented. The processing system 200 with an enabled cache security mechanism is powered-up in element 500. Upon power-up, the cache system 250 may not correctly decrypt content until a cache key is sent to the cache system 250. Powering-up a processing system 200 may include starting or resetting a personal computer, laptop, server, or mobile device. In this embodiment, an option ROM 310 loads an initial program loader routine that performs minimal processor 304 initialization and transfers boot-loader code from the option ROM 310 to the processor 304 (element 510). In another embodiment, a managed flash device such as the cache system 250 may emulate the functionality of an option ROM 310 and transfer the boot-loader code to the processor 304.

In element 520 a disk status is determined, such as determining whether the high capacity storage system 240, such as a disk in this embodiment, is locked or if the disk has been unlocked. This determination may be made by intercepting disk read/write accesses, which indicates that the disk is accessible and has been unlocked. If the disk has not been unlocked, as in element 530, code is loaded by the option ROM 310 to intercept an IO and OS 215 boot sequence. Once the disk has been unlocked in element 540, the cache key is read from the high capacity storage memory 280 or disk based upon the disk location stored in the cache system 250 (element 550). Optionally, code from the option ROM 310 may also detect a key used to unlock the disk. The cache key, recovered from the high capacity storage system 240, is authenticated by the cache security system. If authentic, the cache key is set in the cache system 250 for encryption/decryption of cache writes/reads in element 560. If the authenticity of the cache key is false, then the cache system 250 may maintain no or limited functionality.

In another embodiment, the cache security system may additionally request a confirmation key to authenticate a user before providing write access of user/cache data. In a further embodiment, the cache system 250 may be triggered to authenticate the high capacity storage system 240 in response to one of a power cycle, a time period, a usage volume, and a random event. The processing system 200 is then booted by executing a boot sequence in element 570.

The operation discussed herein may be generally facilitated via execution of appropriate firmware or software embodied as code instructions on the host processor and microcontroller, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for managing a cache key in a device, comprising:
   binding a solid-state drive cache system to a hard disk drive to include negotiating a cryptographic algorithm for authentication and establishment of a secure channel between the solid-state drive cache system and the hard disk drive;
   identifying a disk location in the hard disk drive and storing the cache key in the disk location;
   storing the disk location in the solid-state drive cache system;
   enabling caching of the hard disk drive to the solid-state drive cache system to provide write access of user/cache data; and
   encrypting solid-state drive cache system with the cache key.

2. The method of claim 1, further comprising generating the cache key by auto generation or by providing the cache key from a user.

3. The method of claim 1, further comprising storing the cache key in the solid-state drive cache system.

4. The method of claim 1, further comprising determining if cache security is enabled.

5. The method of claim 3, further comprising limiting a function of the solid-state drive cache system before storing the cache key in the solid-state drive cache system.

6. The method of claim 1, further comprising requesting a confirmation key to authenticate a user.

7. The method of claim 1, further comprising triggering the solid-state drive cache system to authenticate the hard disk drive in response to one of a power cycle, a time period, a usage volume, and a random event.

8. A non-transitory machine-accessible medium that provides instructions, which when accessed, cause a machine to perform operations for managing a cache key in a device, the operations comprising:
   binding a solid-state drive cache system to a hard disk drive to include negotiating a cryptographic algorithm for authentication and establishment of a secure channel between the solid-state drive cache system and the hard disk drive;
   identifying a disk location in the hard disk drive and storing the cache key in the disk location;
   storing the disk location in the solid-state drive cache system;
   enabling caching of the hard disk drive to the solid-state drive cache system to provide write access of user/cache data; and
   encrypting the solid-state drive cache system with the cache key.

9. The non-transitory machine-accessible medium of claim 8, further comprising determining if cache security is enabled.

10. The non-transitory machine-accessible medium of claim 8, further comprising limiting a function of the solid-state drive cache system before storing the disk location in the solid-state drive cache system.

11. The non-transitory machine-accessible medium of claim 8, further comprising generating the cache key by auto generation or by providing the cache key from a user.

12. The non-transitory machine-accessible medium of claim 8, further comprising requesting a confirmation key to authenticate a user.

13. The non-transitory machine-accessible medium of claim 8, further comprising triggering the solid-state drive cache system to authenticate the hard disk drive in response to one of a power cycle, a time period, a usage volume, and a random event.

* * * * *